May 20, 1952 R. G. ZENICK 2,597,217
FILTER APPARATUS
Filed April 23, 1948
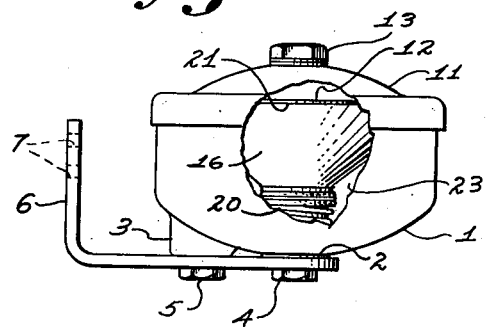
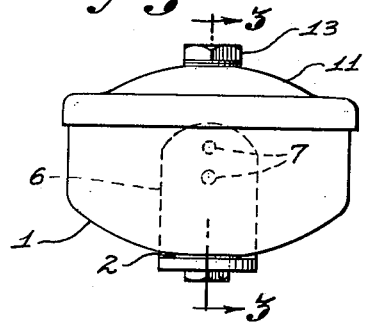
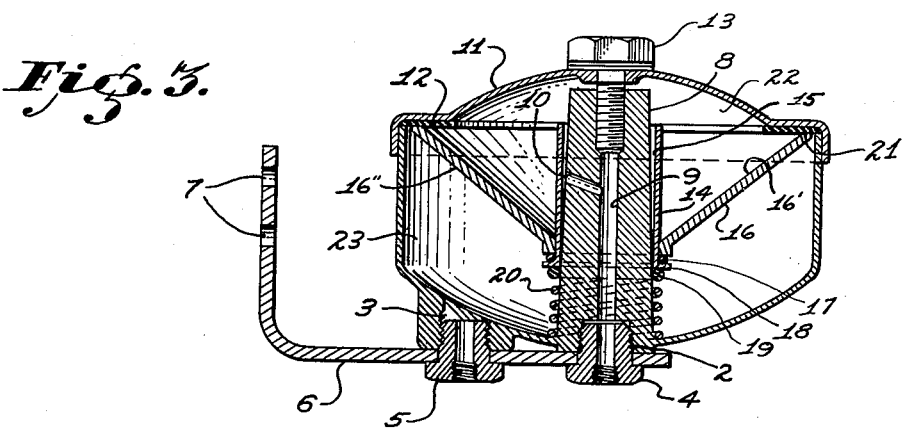
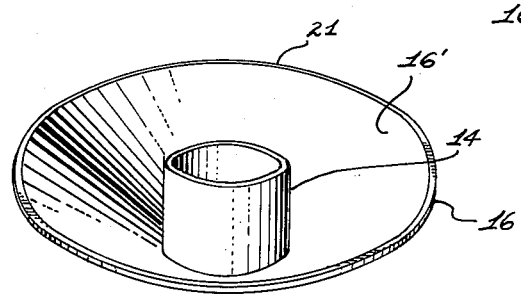
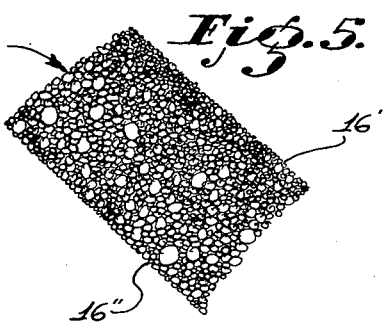
INVENTOR.
RAYMOND G. ZENICK
BY
Harold J. LeConte
ATTORNEY Patented May 20, 1952

2,597,217

UNITED STATES PATENT OFFICE 2,597,217

FILTER APPARATUS

Raymond G. Zenick, Burbank, Calif., assignor to Filterall Co., Inc., Glendale, Calif., a corporation of California Application April 23, 1948, Serial No. 22,798

7 Claims. (Cl. 210—166)

This invention relates to filters and more particularly to an improved form thereof for filtering the oil in a lubricant circulating system used in lubricating machines of which internal combustion engines are an example.

An object of the invention is to provide a filtering apparatus of the above character having incorporated therein a filtering element formed of porous metal.

Another object of the invention is to provide an oil filter for internal combustion engines and other machines in which the filtering element is of such character that all sediment and foreign matter removed by the filter is retained at the entrant side of the filter element so that the element may be readily cleaned and restored to use.

Still another object of the invention is to provide an oil filter for machines having a pressure lubricating system which is so constructed and arranged that the filtering element may be readily removed for cleaning and may then be returned to the filter assembly for use.

A still further object of the invention is to provide an oil filter for pressure lubricating systems which is so constructed and arranged that in the event of any excess pressure against the filter element the fluid will be by-passed around the filter element.

A still further object of the invention is to provide an oil filter for pressure lubricating systems in which the filtering element is so mounted as to operate as a by-pass valve to relieve excess pressure.

Still another object of the invention is to provide an oil filter for internal combustion engines and other machines having pressure lubricating systems which can be readily installed in the existing system as an accessory thereto and which is simple in construction, reliable in operation and economical to manufacture and to maintain in operative condition.

With the above objects in view, together with such other objects and advantages as may subsequently appear, the invention resides in the parts, and in the construction, combination, and arrangement of parts, or of equivalents thereof, described in the following specifications; reference being had to the accompanying drawings of an illustrative form of the invention and in which drawings:

Fig. 1 is a side elevation of a filter apparatus embodying the principles of the invention; a portion of the side wall being broken away to show details of interior construction.

Fig. 2 is a second side elevation of the filter apparatus shown in Fig. 1; the view being taken at right angles to Fig. 1.

Fig. 3 is an enlarged, transverse, sectional view of the filter apparatus taken on the line 3—3 of Fig. 2.

Fig. 4 is a perspective view of the filter element assembly, and

Fig. 5 is a greatly enlarged, somewhat diagrammatic, fragmentary, sectional view of the filter element, showing the arrangement of the grains of metal from which it is formed whereby an improved filtering action is achieved.

In the form illustrated, the filter apparatus comprises a bowl 1 having at the bottom thereof an axially disposed inlet port 2 and adjacent the periphery thereof an outlet port 3 both of which are internally threaded to receive fittings 4 and 5 which also extend through and serve to clamp one end of a supporting bracket 6 to the bottom of the bowl. The bracket at its other end is provided with holes 7, 7 by which it and the filter apparatus may be secured to or adjacent to the engine or other machine with which it is associated and the fittings 4 and 5 are internally threaded for connection in series in a line forming a part of the lubricating system of the engine or machine.

Preferably formed as an integral part of and rising from the bottom of the bowl 1 is an axially disposed post 8, the upper end of which is higher than the edge of the bowl. This post contains a longitudinal bore 9 extending from the inlet port 2 to a lateral port 10 leading to the exterior of the post at about the mid-point of its length. The top of the bowl is closed by a cover 11 having a gasket 12 engaging the edge of the bowl and extending inwardly therefrom and the cover is held in place thereon by a bolt 13 threaded into the upper end of the post 8.

The post 8 is circular in cross section and preferably is slightly tapered toward its free end and loosely slidingly mounted on the post is a sleeve 14 the exterior of which is straight and the interior of which is slightly tapered inwardly toward its lower end with resultant creation of an increased clearance 15 between the upper portion of the sleeve and the post than at the lower end thereof. This clearance may be formed by tapering either the sleeve or the post alone or by tapering both as here shown or by abrupt changes in diameters so long as the increased clearance is provided. The sleeve 14 carries a filter element 16 of hollow, inverted, frusto-conical form; the minor diameter of which engages the exterior of the sleeve with a press fit. Leakage between the filter element and the sleeve is prevented by a resilient gasket element 17 surrounding the sleeve 14 below the lower end of the filter element and held in place by a flange 18 formed on the lower end of the sleeve as best shown in Fig. 3.

Preferably, the filter element is formed of porous, sintered metal, the grains of which prior to sintering are so arranged as to form an entrant surface 16' of less porosity than the discharge surface 16". Such a filter element and a mode of making the same is described and claimed in my co-pending application, Serial No. 18,315, filed April 1, 1948, now abandoned, and the division thereof, Serial No. 111,303, filed August 19, 1949.

Surrounding the post 8 and engaging the lower face of the flange 18 is a second resilient gasket 19 the lower face of which is engaged by the upper end of a compression spring 20 also surrounding the post and the lower end of the spring rests on the bottom of the bowl. This spring operates to hold the gasket 19 tightly against the flange 18 and to prevent leakage of oil from the bottom of the sleeve and further operates to cause the gasket 17 to be engaged between the flange 18 and the end of the filter element 16 and still further to hold the filter element assembly comprising the sleeve 14 and filter element 16 with the upper edge 21 in yielding engagement with the cover gasket 12. Thus, the filter element 16 and the sleeve with the gaskets 17 and 19 divide the interior of the bowl into a receiving cavity 22 and a discharge cavity 23.

In operation, oil is delivered through the inlet port 2, passage 9 and lateral port 10 into the clearance space 15 and since this space is sealed at the lower end by the gasket 19, the oil is discharged from the top of the sleeve into the receiving cavity 22. The oil then passes through the pores in the filter element 16 into the discharge cavity 23 and thence out of the discharge port 3 back into the lubricating system. If the filter element becomes fouled or if for any other reason the oil can not pass through the filter element as fast as it is delivered to the receiving cavity with resultant increase of pressure therein, the pressure will react against the yielding mounting of the filter element and will cause the filter element to be moved out of contact with the gasket 12 against the load imposed by the spring 20 so that some of the oil can by-pass the filter element and can escape directly into the the discharge cavity 23 over the edge 21 of the filter element with some of the oil still passing through the filter element until such time as the filter element is cleaned or the cause of the increase in pressure is otherwise terminated. In this connection, it is particularly to be noted that as shown in Fig. 3, the top of the sleeve 14 is substantially at the same level as the top edge 21 of the filter element and that because of this during the by-passing of oil, the oil so by-passed will be that flowing across the top of the body of oil in the receiving cavity and will be less liable to carry with it any of the heavier sediment trapped in the receiving cavity.

To remove the filter element for cleaning, the cover 11 is removed by unscrewing the bolt 13 and the filter element assembly lifted off the post 8 by grasping the end of the sleeve 14. Since, as has been pointed out above, the top edges of the sleeve and the filter element are substantially in the same plane, the sediment-containing oil trapped therein is also removed without danger that it will be spilled into the discharge cavity. After being cleaned, the filter element assembly is dropped back on the post 8 and the cover replaced; the tightening of the bolt 13 serving also to compress the spring 20 to create yielding engagement between the filter element and the gasket 12.

Thus there has been created a filter apparatus for lubricating systems which can readily be installed in existing systems and which is of small size and which, further, is so constructed that in the event of clogging, it will by-pass the oil so as not to interrupt the operation of the lubrication of the machine and in which the filter element can be removed, cleaned and replaced without disconnecting the filter apparatus from the system.

While I have described an illustrative mode of execution of my invention, I do not limit myself to the exact form disclosed, and the invention includes such modifications of the parts and of their equivalents and of the construction, combination, and arrangement thereof as come within the purview of the appended claims.

I claim:

1. An oil filter comprising a bowl having inlet and outlet ports affording means of connection in series in a lubrication system, a post extending upwardly from the bottom of said bowl and having a bore extending longitudinally thereof from said inlet port to a discharge orifice at a point above the bottom of said bowl, cover means enclosing the top of said bowl, a filter element slidably mounted on said post and having its lower end disposed in a plane transverse to said port and located between said orifice and the bottom of said bowl, separate gasket means carried by said cover and said post constructed and arranged to engage the upper and lower ends, respectively, of said filter element with resultant division of the interior of said bowl by said filter element and gasket means into fluid receiving and fluid discharge cavities; said upper gasket means having a portion thereof disposed between said cover and said bowl and serving as a sealing gasket therebetween and said lower gasket means being slidably mounted on said post, and resilient means surrounding said post and reacting between the bottom of said bowl and said lower gasket means effective to maintain said lower gasket means in sealing relation between said post and the lower end of said filter element while maintaining the upper end of said filter element in yielding engagement with said upper gasket means.

2. An oil filter comprising a bowl having an outlet port in the bottom thereof and having a post extending upwardly from the bottom thereof; said post having a fluid inlet channel terminating in an orifice in the side of said post, a cover enclosing the top of said bowl, a sealing gasket disposed between the cover and said bowl, fluid pressure responsive means normally dividing the interior of said bowl into fluid receiving and fluid discharge cavities comprising a filter element of hollow inverted frusto-conical form slidingly mounted on said post and means maintaining the upper, outer edge of said filter element in yielding engagement with said gasket.

3. An oil filter comprising a bowl having a cover detachably closing the open end thereof and having an axially disposed post rising from the bottom thereof; said post having a fluid inlet channel terminating in a discharge orifice in the side wall thereof, a sleeve mounted for movement on said post and extending above and below said orifice, a filter element of hollow inverted frusto-conical form carried by said sleeve and dividing said bowl into fluid receiving and fluid discharge cavities, and an outlet port extending between said discharge cavity and the exterior of said bowl.

4. A filter for oil and the like comprising a body member in the form of a bowl having a removable cover secured thereto, filter means comprising a hollow, inverted, frusto-conical filter element having an axially disposed sleeve substantially co-extensive in length with the height of said filter element, a spring interposed between said body and said filter element and sleeve effective to maintain the larger end of said filter element in yielding engagement with a wall of said body member and by such engagement to divide the interior thereof into fluid receiving and fluid discharge cavities; said spring permitting said filter means to respond to the presence of excess pressure to by-pass fluid direct from said receiving cavity to said discharge cavity, and inlet and outlet ports in said body affording communication between the exterior of said body and said receiving and discharge cavities respectively.

5. A filter for fluids comprising a body member in the form of a bowl having an axially disposed post rising from the center thereof, a cover engaging the open side of said bowl, a bolt threaded into the end of said post effective to removably secure said cover on said bowl, and filter means comprising a sleeve supporting a filter element of inverted frusto-conical form freely mounted on said post and yieldingly engaging said cover to divide the interior of said bowl into fluid receiving and fluid discharge cavities, the surface of said filter element adjacent said fluid receiving cavity being of less porosity than the opposite side thereof and said sleeve and filter element combining to form a sediment retaining space.

6. A filter for fluids comprising a hollow body member having a centrally disposed post rising from the bottom thereof and a removable cover secured to said post and engaging the edge of said body member, filter means within said body dividing the interior thereof into fluid receiving and fluid discharge cavities; said filter means comprising a porous metal filter element of hollow, inverted frusto-conical form having an axially disposed sleeve substantially co-extensive in length with the height of said filter element slidably mounted on said post, the mounting of said filter means within said body being so constructed and arranged that said filter means is held in yielding engagement with said cover and operates as a by-pass valve to permit the passage of fluids direct from the receiving cavity to the discharge cavity in the event of excess fluid pressure within said receiving cavity.

7. A filter means for fluids for use with a casing of the type comprising a bowl having inlet and outlet ports extending through the wall thereof and having a removable cover and an axially disposed hollow post rising from the bottom of the bowl and having an orifice in the side wall of the post constituting an extension of one of said ports, said filter means comprising a rigid, thin walled, porous filter element of hollow, frusto-conical form having an axially disposed sleeve extending from the smaller end of said element to the plane of the larger end thereof; said sleeve being loosely mountable on the casing post and effective to maintain said filter element in axial alignment with the post, a gasket interposable between the larger end of said filter element and the bowl cover, resilient means mountable on the casing post and extending from the bottom of the bowl upwardly to a point below the casing post orifice effective to urge said filter element into yielding engagement with said gasket, and a second gasket interposed between the smaller end of said filter element and said resilient means effective to prevent fluid flow between the lower end of said sleeve and the casing post.

RAYMOND G. ZENICK.

REFERENCES CITED

The following references are of record in the file of this patent:

UNITED STATES PATENTS

| Number | Name | Date |
|---|---|---|
| 1,019,161 | Ivor | Mar. 5, 1912 |
| 1,639,170 | Fell | Aug. 16, 1927 |
| 1,723,945 | McCutcheon | Aug. 6, 1929 |
| 1,744,837 | Pelletier | Jan. 28, 1930 |
| 1,805,450 | Harvey | May 12, 1931 |
| 2,147,792 | Knight | Feb. 21, 1939 |
| 2,267,918 | Hildabolt | Dec. 30, 1941 |
| 2,297,817 | Truxell, Jr., et al. | Oct. 6, 1942 |
| 2,359,386 | Reinsch | Oct. 3, 1944 |
| 2,406,308 | Vokes et al. | Aug. 20, 1946 |
| 2,422,647 | Vokes | June 17, 1947 |
| 2,529,398 | Kriech | Nov. 7, 1950 |